United States Patent
Nozawa

(10) Patent No.: US 12,110,357 B2
(45) Date of Patent: Oct. 8, 2024

(54) BLOCK COPOLYMER, BLOCK COPOLYMER COMPOSITION, HOT MELT PRESSURE-SENSITIVE ADHESIVE COMPOSITION, AND PRESSURE-SENSITIVE ADHESIVE COMPOSITION

(71) Applicant: ZEON CORPORATION, Tokyo (JP)

(72) Inventor: Atsushi Nozawa, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 668 days.

(21) Appl. No.: 17/292,964

(22) PCT Filed: Nov. 20, 2019

(86) PCT No.: PCT/JP2019/045396
§ 371 (c)(1),
(2) Date: May 11, 2021

(87) PCT Pub. No.: WO2020/110854
PCT Pub. Date: Jun. 4, 2020

(65) Prior Publication Data
US 2021/0403631 A1    Dec. 30, 2021

(30) Foreign Application Priority Data
Nov. 30, 2018   (JP) .................................. 2018-225336

(51) Int. Cl.
*C08F 297/04* (2006.01)
*C08L 53/02* (2006.01)
*C09J 153/02* (2006.01)

(52) U.S. Cl.
CPC ............ *C08F 297/04* (2013.01); *C08L 53/02* (2013.01); *C09J 153/02* (2013.01); *C09J 2301/304* (2020.08); *C09J 2301/414* (2020.08)

(58) Field of Classification Search
CPC ......... C08F 297/04; C08L 53/02; C09J 53/02; C09J 2301/304; C09J 2301/414
See application file for complete search history.

(56) References Cited

U.S. PATENT DOCUMENTS

| | | | |
|---|---|---|---|
| 4,391,949 A | 7/1983 | St Clair | |
| 4,444,953 A | 4/1984 | St Clair | |
| 5,296,547 A | 3/1994 | Nestegard et al. | |
| 5,393,787 A | 2/1995 | Nestegard et al. | |
| 5,393,841 A | 2/1995 | Himes et al. | |
| 5,412,031 A * | 5/1995 | Ma ........................ | C09J 7/387 525/98 |
| 5,461,116 A | 10/1995 | Hoxmeier et al. | |
| 5,550,196 A | 8/1996 | Spence et al. | |
| 5,554,690 A | 9/1996 | Spence et al. | |
| 5,576,395 A | 11/1996 | Spence et al. | |
| 5,804,663 A | 9/1998 | De Craene et al. | |
| 2017/0145267 A1 | 5/2017 | Liu et al. | |
| 2018/0258328 A1 | 9/2018 | Nozawa et al. | |
| 2019/0203085 A1 | 7/2019 | Liu et al. | |

FOREIGN PATENT DOCUMENTS

| | | |
|---|---|---|
| JP | S62295979 A | 12/1987 |
| JP | H08505897 A | 6/1996 |
| JP | H08208780 A | 8/1996 |
| JP | H08208781 A | 8/1996 |
| JP | 2017531057 A | 10/2017 |
| JP | 2018021112 A | 2/2018 |
| WO | 2017057049 A1 | 4/2017 |

OTHER PUBLICATIONS

Feb. 25, 2020, International Search Report issued in the International Patent Application No. PCT/JP2019/045396.
May 25, 2021, International Preliminary Report on Patentability issued in the International Patent Application No. PCT/JP2019/045396.
Jul. 15, 2022, the Extended European Search Report issued by the European Patent Office in the corresponding European Patent Application No. 19888807.5.

* cited by examiner

*Primary Examiner* — Ling Siu Choi
*Assistant Examiner* — Andrea Wu
(74) *Attorney, Agent, or Firm* — KENJA IP LAW PC

(57) ABSTRACT

There is provided a block copolymer A which is represented by a following general formula (I), wherein a ratio $((Ar^1\text{-}D^1)/D^2)$ of a mass of a branched chain represented by $Ar^1\text{-}D^1$ to a mass of a branched chain represented by $D^2$ is 1.0/0.15 to 1.0/1.75, $$(Ar^1\text{-}D^1)_m X(D^2)_n \qquad (I)$$

where, in the formula (I), $Ar^1\text{-}D^1$ and $D^2$ are each a branched chain bonded to X, $Ar^1$ is an aromatic monovinyl polymer block, $D^1$ and $D^2$ are each a conjugated diene polymer block, "m" is an integer of 1 or more, "n" is an integer of 1 or more, "m"+"n" is an integer of 3 or more, and X is a residue of a polyfunctional coupling agent.

16 Claims, No Drawings

BLOCK COPOLYMER, BLOCK COPOLYMER COMPOSITION, HOT MELT PRESSURE-SENSITIVE ADHESIVE COMPOSITION, AND PRESSURE-SENSITIVE ADHESIVE COMPOSITION

TECHNICAL FIELD

The present invention relates to a block copolymer, a block copolymer composition, a hot-melt adhesive composition containing the block copolymer or the block copolymer composition, and an adhesive composition obtained using the hot-melt adhesive composition.

BACKGROUND ART

Hot-melt adhesive is used in various fields because it has a property of solidifying in a short time when cooled from a heated and melted state, it is possible to efficiently bond various products, and moreover, it is an adhesive having high safety to a human body due to that it does not require a solvent. For example, when an adhesive for sealing for a paper, a corrugated board, a film used in a food, a clothing, an electronic device, a cosmetic, and the like, or a sanitary article such as a paper diaper and a sanitary article is manufactured, a hot-melt adhesive is preferably used as an adhesive for adhering a member for constituting them. Also, the hot-melt adhesive is preferably used as an adhesive constituting an adhesive layer of an adhesive tape or a label.

As a base polymer for constituting the hot-melt adhesive, various thermoplastic resins have been used, and it is known to use, for example, an aromatic-conjugated diene copolymer such as a styrene-isoprene block copolymer and a styrene-butadiene block copolymer.

Patent Document 1 describes that a polymodal asymmetric elastic block copolymer having two or more kinds of arms having different molecular weights is used as a base polymer of a pressure-sensitive adhesive.

RELATED ART

Patent Documents

Patent Document 1: JP-A-8-505897

SUMMARY OF THE INVENTION

Problem to be Solved by the Invention

However, in Patent Document 1, although a solution type adhesive composition prepared by dissolving a composition containing a polymodal asymmetric elastic block copolymer in toluene has been specifically studied, a hot-melt properties (moderate fluidity at the time of heating), which are basic properties required for a hot-melt adhesive, has not been studied.

In view of such circumstances, it is an object of the present invention to provide a block copolymer capable of obtaining a hot-melt adhesive composition excellent in hot-melt properties, initial tackiness and cross-linkability, and also capable of obtaining an adhesive composition excellent in heat resistance stability, adhesiveness at high temperature and initial tackiness.

Means for Solving the Problem

As a result of extensive studies to solve the above problems, the present inventor has found that the above problems can be solved by a block copolymer having a branched structure which has one or more branched chains constituted by a diblock chain containing an aromatic monovinyl polymer block and a conjugated diene polymer block and has one or more branched chains constituted by a conjugated diene polymer block chain, thereby completing the present invention.

That is, according to the present invention, there is provided a block copolymer A which is represented by a following general formula (I),
wherein a ratio $((Ar^1\text{-}D^1)/D^2)$ of a mass of a branched chain represented by $Ar^1\text{-}D^1$ to a mass of a branched chain represented by $D^2$ is 1.0/0.15 to 1.0/1.75, $$(Ar^1\text{-}D^1)_m X(D^2)_n \qquad (I)$$

where, in the formula (I), $Ar^1\text{-}D^1$ and $D^2$ are each a branched chain bonded to X, $Ar^1$ is an aromatic monovinyl polymer block, $D^1$ and $D^2$ are each a conjugated diene polymer block, "m" is an integer of 1 or more, "n" is an integer of 1 or more, "m"+"n" is an integer of 3 or more, and X is a residue of a polyfunctional coupling agent.

In the block copolymer A, it is preferable that a ratio $(D^1/D^2)$ of a weight average molecular weight of the block $D^1$ in the branched chain represented by $Ar^1\text{-}D^1$ to a weight average molecular weight of the branched chain represented by $D^2$ is 1.0/0.3 to 1.0/1.1.

In the block copolymer A, it is preferable that the polyfunctional coupling agent is a compound having two or more radically polymerizable groups in its molecule.

In the block copolymer A, it is preferable that the polyfunctional coupling agent is divinyl benzene.

In the block copolymer A, it is preferable that a molecular weight distribution (Mw/Mn) is 1.40 or less.

Further, according to the present invention, there is provided a block copolymer composition comprising the above block copolymer A, a diblock copolymer B, and a polymer C, wherein
a content of the block copolymer A in the block copolymer composition is 10% by mass or more, and a total content of the diblock copolymer B and the polymer C in the block copolymer composition is 60% by mass or less,
a content of an aromatic monovinyl monomer unit in the block copolymer composition is within a range of 5 to 40% by mass,
a weight average molecular weight (Mw) of the entire block copolymer composition is within a range of 300000 to 800000,
a melt index measured according to ASTM D1238 of the block copolymer composition (G condition, 200° C., 5 kg load) within a range of 0.5 to 50 g/10 min,
the diblock copolymer B is a diblock copolymer represented by a following general formula (II) and having a molecular weight distribution (Mw/Mn) of 1.20 or less, $$Ar^3\text{-}D^3 \qquad (II)$$

where, in the formula (II), $Ar^3$ is an aromatic monovinyl polymer block, and $D^3$ is a conjugated diene polymer block, and
the polymer C is a conjugated diene polymer having a molecular weight distribution (Mw/Mn) of 1.20 or less.

It is preferable that a vinyl bond content in a conjugated diene monomer unit in the block copolymer composition is 1 to 20% by mass.

Further, according to the present invention, there is provided a hot-melt adhesive composition comprising, 100 parts by mass of the above block copolymer A or 100 parts by mass of the above block copolymer composition, 25 to 400 parts by mass of a tackifying resin, 0.01 to 50 parts by mass of a cross-linking agent, and 0 to 200 parts by mass of a plasticizer.

Further, according to the present invention, there is provided an adhesive composition obtained by cross-linking the block copolymer A or the block copolymer composition contained in the above hot-melt adhesive composition.

Effects of Invention

According to the present invention, it is possible to provide a block copolymer capable of obtaining a hot-melt adhesive composition excellent in hot-melt properties, initial tackiness and cross-linkability, and also capable of obtaining an adhesive composition excellent in heat resistance stability, adhesiveness at high temperature and initial tackiness, and to provide a block copolymer composition containing such a block copolymer, a hot-melt adhesive composition containing such a block copolymer or such a block copolymer composition, and an adhesive composition obtained using the hot-melt adhesive composition.

DESCRIPTION OF EMBODIMENTS

1. Block Copolymer A

A block copolymer A of the present invention is a block copolymer represented by the following general formula (I):

$$(Ar^1-D^1)_m X(D^2)_n \qquad (I)$$

In the general formula (I), $Ar^1-D^1$ and $D^2$ are each a branched chain bonded to X, "m" is the number of branched chains represented by $Ar^1-D^1$ which are bonded to X, and "n" is the number of branched chains represented by $D^2$ which are bonded to X. "m"+"n" is the sum of the branched chains represented by $Ar^1-D^1$ and the branched chains represented by $D^2$, and thus "m"+"n" represents the number of branches of the block copolymer A. $Ar^1$ is an aromatic monovinyl polymer block, and $D^1$ and $D^2$ are each a conjugated diene polymer block.

In the general formula (I), "m" is an integer of 1 or more, "n" is an integer of 1 or more, and "m"+"n" is an integer of 3 or more. That is, the block copolymer A has a branched structure formed by three or more branched chains, and the block copolymer A has both branched chain represented by $Ar^1-D^1$ (a diblock chain including an aromatic monovinyl polymer block and a conjugated diene polymer block) and branched chain represented by $D^2$ (a conjugated diene polymer block chain). Since the block copolymer A has such a configuration, it is possible to obtain a hot-melt adhesive composition excellent in hot-melt properties, initial tackiness and cross-linkability by using the block copolymer A, and also to obtain an adhesive composition excellent in heat resistance stability, adhesiveness at high temperature and initial tackiness. Further, by cross-linking the hot-melt adhesive composition containing the block copolymer A, it is possible to obtain an adhesive composition having improved heat resistance stability and adhesion at high temperature without greatly impairing the excellent initial tackiness possessed by the hot-melt adhesive composition. Therefore, the block copolymer A of the present invention also has an advantage that it can be suitably utilized in a hot-melt adhesive composition and also in an adhesive composition obtained by cross-linking it.

In the general formula (I), "m"+"n" is an integer of 3 or more, and is preferably an integer of 4 or more, preferably an integer of 20 or less, because the adhesive properties at a higher temperature and the initial tackiness are more excellent.

The block copolymer A may be composed of only one kind of block copolymer having substantially a single configuration, or may be composed of two or more kinds of block copolymers having substantially different configurations.

In addition, the block copolymer A of the present invention may be a mixture of block copolymers in which any one of "m", "n" and "m"+"n" is different. When the average molecular weight of the block copolymer A is determined by measurement using high performance liquid chromatography described later and "m", "n" and "m"+"n" are calculated, since the average values of "m", "n" and "m"+"n" of a plurality of block copolymers in the mixture are calculated, these calculated values may not necessarily be integers, but in the present invention, an integer most close to the calculated value may be specified as "m", "n" and "m"+"n".

(1-1) Aromatic Monovinyl Polymer Block $Ar^1$

The aromatic monovinyl polymer block $Ar^1$ constituting the block copolymer A is a polymer block having an aromatic monovinyl monomer unit as its constituent unit. An aromatic monovinyl monomer used for constituting the aromatic monovinyl monomer unit of the aromatic monovinyl polymer block $Ar^1$ is not particularly limited as long as it is an aromatic vinyl compound having one radically polymerizable group. Examples thereof include styrene, α-methylstyrene, 2-methylstyrene, 3-methylstyrene, 4-methylstyrene, 2-ethylstyrene, 3-ethylstyrene, 4-ethylstyrene, 2,4-diisopropyl styrene, 2,4-dimethylstyrene, 4-t-butylstyrene, 5-t-butyl-2-methylstyrene, 2-chlorostyrene, 3-chlorostyrene, 4-chlorostyrene, 4-bromostyrene, 2-methyl-4,6-dichlorostyrene, 2,4-dibromostyrene, vinylnaphthalene, and the like. Of these, styrene is preferably used as the aromatic monovinyl monomer. These aromatic monovinyl monomers can be used alone or in combination of two or more types in the aromatic monovinyl polymer block $Ar^1$.

The aromatic monovinyl polymer block $Ar^1$ may contain a monomer unit other than the aromatic monovinyl monomer unit. As a monomer constituting the monomer unit other than the aromatic monovinyl monomer unit, a conjugated diene monomer such as 1,3-butadiene and isoprene (2-methyl-1,3-butadiene), an α,β-unsaturated nitrile monomer, an unsaturated carboxylic acid or an acid anhydride monomer, an unsaturated carboxylic acid ester monomer, and a non-conjugated diene monomer are exemplified. The content of the monomer unit other than the aromatic monovinyl monomer unit in the aromatic monovinyl polymer block $Ar^1$ is preferably 20% by mass or less, more preferably 10% by mass or less, and particularly preferably substantially 0% by mass.

The weight average molecular weight ($Mw(Ar^1)$) of the aromatic monovinyl polymer block $Ar^1$ is not particularly limited, but may be within a range of 7000 to 18000, preferably within a range of 7500 to 17000, more preferably within a range of 8000 to 16000. By setting the weight average molecular weight ($Mw(Ar^1)$) of the aromatic monovinyl polymer block $Ar^1$ within the above ranges, it is possible to improve the holding force of the obtained hot-melt adhesive composition as an adhesive, and to obtain the hot-melt adhesive composition having an appropriate melt viscosity.

In the present invention, the weight average molecular weight (Mw) and the number average molecular weight (Mn) of the polymer block, the branched chain, the block copolymer, the block copolymer composition, and the like are determined as a value in terms of polystyrene by measurement of high performance liquid chromatography. The weight average molecular weight and the number average molecular weight can be determined more specifically as the molecular weight in terms of polystyrene by high performance liquid chromatography using tetrahydrofuran having a flow rate of 0.35 ml/min as a carrier. The device is a HLC8320 manufactured by Tosoh Corporation, a column is obtained by connecting three Shodex (Registered trademark) KF-404HQ columns manufactured by Showa Denko K.K. (column temperature 40° C.), a detector is used a differential refractometer and an ultraviolet detector, and a calibration of a molecular weight can be performed at 12 points of the standard polystyrenes (500 to 3000000) available from Polymer Laboratories Ltd.

(1-2) Conjugated Diene Polymer Block $D^1$

The conjugated diene polymer block $D^1$ constituting the block copolymer A is a polymer block having a conjugated diene monomer unit as a constituent unit. A conjugated diene monomer used for constituting the conjugated diene monomer unit of the conjugated diene polymer block $D^1$ is not particularly limited as long as it is a conjugated diene compound, and examples thereof include 1,3-butadiene, isoprene (2-methyl-1,3-butadiene), 2,3-dimethyl-1,3-butadiene, 2-chloro-1,3-butadiene, 1,3-pentadiene, and 1,3-hexadiene. Among these conjugated diene monomers, 1,3-butadiene and/or isoprene are preferably used, and isoprene is particularly preferably used. By configuring the conjugated diene polymer block $D^1$ with the isoprene monomer unit, the obtained hot-melt adhesive composition becomes excellent in adhesiveness and flexibility. These conjugated diene monomers can be used alone or in combination of two or more types in the conjugated diene polymer block $D^1$.

In addition, some of the unsaturated bonds of the conjugated diene-polymer block $D^1$ may be hydrogenated.

The conjugated diene polymer block $D^1$ may contain a monomer unit other than the conjugated diene monomer unit. Examples of a monomer constituting the monomer unit other than the conjugated diene monomer unit include an aromatic monovinyl monomer such as styrene and α-methylstyrene, an α,β-unsaturated nitrile monomer, an unsaturated carboxylic acid or an acid anhydride monomer, an unsaturated carboxylic acid ester monomer, and a non-conjugated diene monomer. The content of the monomer unit other than the conjugated diene monomer unit in the conjugated diene polymer block $D^1$ is preferably 20% by mass or less, more preferably 10% by mass or less, and particularly preferably substantially 0% by mass.

The weight average molecular weight $(Mw(D^1))$ of the conjugated diene polymer block $D^1$ is preferably within a range of 20000 to 140000, more preferably within a range of 25000 to 120000, and still more preferably within a range of 30000 to 100000. By setting the weight average molecular weight $(Mw(D^1))$ of the conjugated diene polymer block $D^1$ within the above range, it is possible to improve the initial tackiness of the obtained hot-melt adhesive composition and to obtain the hot-melt adhesive composition having an appropriate melt viscosity.

(1-3) Branched Chain Represented by $Ar^1$-$D^1$

The branched chain represented by $Ar^1$-$D^1$ constituting the block copolymer A may be produced using an arbitrary coupling agent or may be produced without using a coupling agent. That is, the branched chain represented by $Ar^1$-$D^1$ may include a residue of the coupling agent in each polymer block or between each polymer block, or may not include a residue of the coupling agent. However, from the viewpoint of making the hot-melt adhesive composition obtained by using the obtained block copolymer composition excellent in heat resistance and transparency, it is preferable that the branched chain represented by $Ar^1$-$D^1$ is produced without using a coupling agent and does not contain a residue of the coupling agent in each polymer block and between each polymer block.

The weight average molecular weight $(Mw(Ar^1$-$D^1))$ of the branched chain represented by $Ar^1$-$D^1$ is preferably within a range of 30000 to 150000, more preferably within a range of 35000 to 130000, and still more preferably within a range of 40000 to 110000. By setting the weight average molecular weight $(Mw(Ar^1$-$D^1))$ of the branched chain represented by $Ar^1$-$D^1$ within the above range, the hot-melt adhesive composition which is more superior in hot-melt properties, initial tackiness and cross-linkability can be obtained.

The molecular weight distribution (Mw/Mn) of the branched chain represented by $Ar^1$-$D^1$ is preferably within a range of 1.20 or less, more preferably within a range of 1.00 to 1.20, more preferably within a range of 1.00 to 1.18, particularly preferably within a range of 1.00 to 1.13, and further particularly preferably within a range of 1.00 to 1.10. By setting the molecular weight distribution (Mw/Mn) of the branched chain represented by $Ar^1$-$D^1$ in the above range, the hot-melt adhesive composition which is more superior in hot-melt properties, initial tackiness and cross-linkability can be obtained.

(1-4) Branched Chain Represented by $D^2$

The branched chain represented by $D^2$ constituting the block copolymer A is a polymer block chain having a conjugated diene monomer unit as its constituent unit. In particular, since the block copolymer A of the present invention has a branched chain represented by $D^2$, the initial tackiness of the adhesive composition obtained by cross-linking the block copolymer A in the hot-melt adhesive composition is extremely good and the heat resistance stability is also excellent.

A conjugated diene monomer used for constituting the conjugated diene monomer unit of the conjugated diene polymer block $D^2$ is not particularly limited as long as it is a conjugated diene compound, and examples thereof include 1,3-butadiene, isoprene (2-methyl-1,3-butadiene), 2,3-dimethyl-1,3-butadiene, 2-chloro-1,3-butadiene, 1,3-pentadiene, and 1,3-hexadiene. Among these conjugated diene monomers, 1,3-butadiene and/or isoprene are preferably used, and isoprene is particularly preferably used. By configuring the conjugated diene polymer block $D^2$ with the isoprene monomer unit, the obtained hot-melt adhesive composition becomes excellent in adhesiveness and flexibility. These conjugated diene monomers can be used alone or in combination of two or more types in the conjugated diene polymer block $D^2$.

In addition, some of the unsaturated bonds of the conjugated diene-polymer block $D^2$ may be hydrogenated.

The branched chain represented by $D^2$ may contain a monomer unit other than conjugated diene monomer unit. Examples of a monomer constituting the monomer unit other than the conjugated diene monomer unit include an aromatic monovinyl monomer such as styrene and α-methylstyrene, an α,β-unsaturated nitrile monomer, an unsaturated carboxylic acid or an acid anhydride monomer, an unsaturated carboxylic acid ester monomer, and a non-conjugated diene monomer. The content of the monomer unit other than the conjugated diene monomer unit in the conjugated diene polymer block is preferably 20% by mass or less, more preferably 10% by mass or less, and particularly preferably substantially 0% by mass.

The weight average molecular weight (Mw($E^2$)) of the branched chain represented by $D^2$ is not particularly limited, but is preferably within a range of 20000 to 140000, more preferably within a range of 25000 to 120000, and still more preferably within a range of 30000 to 100000. By setting the weight average molecular weight (Mw($E^2$)) of the conjugated diene polymer block $D^2$ within the above range, it is possible to improve the initial tackiness of the obtained hot-melt adhesive composition and to obtain the hot-melt adhesive composition having an appropriate melt viscosity.

(1-5) Residue of the Multifunctional Coupling Agent

A coupling agent for forming the residue X of the multifunctional coupling agent in the block copolymer A may be any coupling agent that can combine with the branched chain represented by $Ar^1$-$D^1$ and the branched chain represented by $D^2$ to give a block copolymer having three or more branched chains in total.

Examples of the polyfunctional coupling agent include a silane compound such as a halogenated silane including tetrachlorosilane and tetrabromosilane, and an alkoxysilane including tetramethoxysilane and tetraethoxysilane; a tin compound such as tin halide including tetrachlorotin; an epoxy compound such as a polycarboxylic acid ester and an epoxidized soybean oil; a compound having two or more radically polymerizable groups in its molecule.

Examples of the compound having two or more radically polymerizable groups in its molecule include a radically polymerizable aromatic compound having two or more radically polymerizable groups and an aromatic ring such as an aromatic divinyl compound including divinyl benzene (DVB), divinyl toluene, divinyl xylene, divinyl anthracene, divinyl naphthalene, divinyl durene, and 1,2-bis(4-vinylphenyl)ethane, an aromatic trivinyl compound including trivinyl benzene, and an aromatic tetravinyl compound including tetravinyl benzene; and a radically polymerizable aliphatic compound having two or more radically polymerizable groups and an aliphatic group such as pentaerythritol tetraacrylate.

In the present invention, as the polyfunctional coupling agent, the compound having two or more radically polymerizable groups in its molecule is preferable, and among them, a radically polymerizable aromatic compound is more preferable, in particular, an aromatic divinyl compound is still more preferable, and divinyl benzene is particularly preferable. By using these coupling agents, the block copolymer A having three or more branched chains can be easily obtained.

(1-6) Block Copolymer A

In the block copolymer A, the ratio ($Ar^1$-$D^1$)/$D^2$) of the mass of the branched chain represented by $Ar^1$-$D^1$ to the mass of the branched chain represented by $D^2$ is 1.0/0.15 to 1.0/1.75, preferably 1.0/0.20 to 1.0/1.0. By making the ratio ($Ar^1$-$D^1$)/$D^2$) within the above range, it is possible to obtain the hot-melt adhesive composition which is excellent in hot-melt properties, initial tackiness, and cross-linkability, and to obtain the adhesive composition which is superior in heat resistance stability, adhesiveness at high temperature, and initial tackiness.

In the block copolymer A, the ratio ($D^1$/$D^2$) of the weight average molecular weight of the block $D^1$ in the branched chain represented by $Ar^1$-$D^1$ to the weight average molecular weight of the branched chain represented by $D^2$ is preferably 1.0/0.3 to 1.0/1.1, more preferably 1.0/0.45 to 1.0/1.03. By setting the ratio ($D^1$/$D^2$) within the above range, the hot-melt adhesive composition which is more excellent in hot-melt properties, initial tackiness, and cross-linkability can be obtained.

The weight average molecular weight (MwA) of the block copolymer A is preferably within a range of 300000 to 800000, more preferably within a range of 330000 to 750000, and still more preferably within a range of 350000 to 700000. By setting the weight average molecular weight (MwA) of the block copolymer A within the above range, the hot-melt adhesive composition which is more excellent in hot-melt properties, initial tackiness and cross-linkability can be obtained.

The molecular weight distribution (Mw/Mn) of the block copolymer A is preferably within a range of 1.40 or less, more preferably within a range of 1.00 to 1.30, still more preferably within a range of 1.00 to 1.20, particularly preferably within a range of 1.00 to 1.18, and most preferably within a range of 1.00 to 1.16. By setting the molecular weight distribution (Mw/Mn) of the block copolymer A within the above range, the hot-melt adhesive composition which is more excellent in hot-melt properties, initial tackiness and cross-linkability can be obtained.

The content of the aromatic monovinyl monomer unit of the block copolymer A (the ratio of the aromatic monovinyl monomer unit to the total monomer units constituting the block copolymer A) is preferably within a range of 5 to 40% by mass, more preferably within a range of 5 to 35% by mass, still more preferably within a range of 6 to 30% by mass, particularly preferably within a range of 8 to 28% by mass, and most preferably within a range of 9 to 26% by mass. By setting the content of the aromatic monovinyl monomer unit of the block copolymer A within the above range, it is possible to improve the holding force of the obtained hot-melt adhesive composition as an adhesive and to improve the adhesiveness and flexibility.

The vinyl bond content in the conjugated diene monomer unit of the block copolymer A (in the total conjugated diene monomer unit constituting the block copolymer A, the ratio occupied by the 1,2-vinyl bond and the 3,4-vinyl bond) is preferably within a range of 1 to 20% by mass, more preferably within a range of 1 to 15% by mass, and particularly preferably within a range of 1 to 10% by mass. If this vinyl bond content is too high, the obtained hot-melt adhesive composition becomes too hard, which may result in inferior adhesive strength.

2. The Block Copolymer Composition

Next, a block copolymer composition of the present invention will be described. The block copolymer composition of the present invention contains at least the block copolymer A and may contain other components such as a diblock copolymer B to be described later and a polymer C to be described later. In the present invention, the block copolymer A and the block copolymer composition exhibit substantially the same effect and can be used in the same application, but the hot-melt adhesive composition and the adhesive composition obtained using the latter, i.e. the block copolymer composition are practically sufficient in heat resistance while being slightly inferior in heat resistance as compared with those obtained using the former, i.e. the block copolymer A, but tend to exhibit a good die cut property, and can be suitably used for label applications.

(2-1) Block Copolymer A

The content of the block copolymer A in the block copolymer composition is within a range of 10% by mass or more, preferably within a range of 30 to 99% by mass, more preferably within a range of 40 to 99% by mass, still more preferably within a range of 50 to 99% by mass, further still more preferably within a range of 60 to 99% by mass, particularly preferably within a range of 70 to 99% by mass, further particularly preferably within a range of 75 to 98% by mass, and most preferably within a range of 80 to 98% by mass, when the total mass of the block copolymer composition is set to 100% by mass. By setting the content of the block copolymer A in the block copolymer composition within the above range, the hot-melt adhesive composition which is more excellent in hot-melt properties, initial tackiness and cross-linkability can be obtained.

(2-2) Diblock Copolymer B

The diblock copolymer B is a diblock copolymer represented by the following general formula (II):

$$Ar^3\text{-}D^3 \quad (II)$$

In the formula (II), $Ar^3$ is an aromatic monovinyl polymer block, and $D^3$ is a conjugated diene polymer block.

The aromatic monovinyl polymer block $Ar^3$ and the conjugated diene polymer block $D^3$ constituting the diblock copolymer B may have the same contents as those of the aromatic monovinyl polymer block $Ar^1$ and the conjugated diene polymer block $D^1$ in the block copolymer A, and therefore descriptions thereof are omitted here.

The diblock copolymer B usually has the same structure as the branched chain represented by $Ar^1\text{-}D^1$ constituting the block copolymer A, but may have a different structure.

In addition, according to the method for producing the block copolymer A of the present invention described later, the structure of the diblock copolymer B can be generally the same as that of the branched chain represented by $Ar^1\text{-}D^1$ constituting the block copolymer A.

The diblock copolymer B may be one produced using an arbitrary coupling agent, and may be one produced without using a coupling agent, but is preferably one containing no residue of a coupling agent in each polymer block and between each polymer block.

The weight average molecular weight (MwB) of the diblock copolymer B is preferably within a range of 30000 to 150000, more preferably within a range of 35000 to 130000, and still more preferably within a range of 4000 to 110000. By setting the weight average molecular weight (MwB) of the diblock copolymer B within the above range, the hot-melt adhesive composition which is more superior in hot-melt properties, initial tackiness and cross-linkability can be obtained.

The molecular weight distribution (Mw/Mn) of the diblock copolymer B is preferably within a range of 1.20 or less, more preferably within a range of 1.00 to 1.20, still more preferably within a range of 1.00 to 1.18, particularly preferably within a range of 1.00 to 1.13, and further particularly preferably within a range of 1.00 to 1.10. By setting the molecular weight distribution (Mw/Mn) of the diblock copolymer B within the above range, the hot-melt adhesive composition which is more superior in hot-melt properties, initial tackiness and cross-linkability can be obtained.

The content of the aromatic monovinyl monomer unit of the diblock copolymer B (the ratio of the aromatic monovinyl monomer unit to the total monomer units constituting the diblock copolymer B) is preferably within a range of 5 to 40% by mass, more preferably within a range of 5 to 35% by mass, still more preferably within a range of 6 to 30% by mass, particularly preferably within a range of 8 to 28% by mass, and most preferably within a range of 9 to 26% by mass.

The vinyl bond content in the conjugated diene monomer unit of the diblock copolymer B (in the total conjugated diene monomer unit constituting the diblock copolymer B, the ratio occupied by the 1,2-vinyl bond and the 3,4-vinyl bond) can be the same as the vinyl bond content in the conjugated diene monomer unit in the block copolymer A.

The content of the diblock copolymer B in the block copolymer composition is preferably within a range of 60% by mass or less, more preferably within a range of 0 to 40% by mass, still more preferably within a range of 0 to 20% by mass, further still more preferably within a range of 0 to 10% by mass, particularly preferably within a range of 0.5 to 10% by mass, and most preferably within a range of 1 to 10% by mass, when the total mass of the block copolymer composition is set to 100% by mass. By setting the content of the diblock copolymer B in the block copolymer composition within the above range, the hot-melt adhesive composition which is more superior in hot-melt properties, initial tackiness and cross-linkability can be obtained.

The diblock copolymer B constituting the block copolymer composition of the present invention may be composed of only one kind of diblock copolymer B having substantially a single configuration, or may be composed of two or more kinds of diblock copolymers B having substantially different configurations.

(2-3) Polymer C

The polymer C is a conjugated diene polymer having a conjugated diene monomer unit as its constitutional unit. A conjugated diene monomer used for constituting the conjugated diene monomer unit of the polymer C is not particularly limited as long as it is a conjugated diene compound, and examples thereof include 1,3-butadiene, isoprene (2-methyl-1,3-butadiene), 2,3-dimethyl-1,3-butadiene, 2-chloro-1,3-butadiene, 1,3-pentadiene, and 1,3-hexadiene. Among these conjugated diene monomers, 1,3-butadiene and/or isoprene are preferably used, and isoprene is particularly preferably used. By configuring the polymer C with the isoprene monomer unit, the obtained hot-melt adhesive composition becomes excellent in adhesiveness and flexibility. Each of these conjugated diene monomers may be used alone or in combination of two or more thereof in polymer C.

In addition, some of the unsaturated bonds of polymer C may be hydrogenated.

The polymer C may contain a monomer unit other than the conjugated diene monomer unit. Examples of a monomer constituting the monomer unit other than the conjugated diene monomer unit include an aromatic monovinyl monomer such as styrene and α-methylstyrene, an α,β-unsaturated nitrile monomer, an unsaturated carboxylic acid or an acid anhydride monomer, an unsaturated carboxylic acid ester monomer, and a non-conjugated diene monomer. The content of the monomer unit other than the conjugated diene monomer unit in the polymer C is preferably 20% by mass or less, more preferably 10% by mass or less, and particularly preferably substantially 0% by mass.

The weight average molecular weight (MwC) of polymer C is preferably within a range of 20000 to 140000, more preferably within a range of 25000 to 120000, and still more preferably within a range of 30000 to 100000. By setting the weight average molecular weight (MwC) of the polymer C within the above range, it is possible to improve the initial tackiness of the obtained hot-melt adhesive composition and to obtain the hot-melt adhesive composition having an appropriate melt viscosity.

The molecular weight distribution (Mw/Mn) of the polymer C is preferably within a range of 1.20 or less, more preferably within a range of 1.00 to 1.20, still more preferably within a range of 1.00 to 1.18, particularly preferably within a range of 1.00 to 1.13, and further particularly preferably within a range of 1.00 to 1.10. By setting the molecular weight distribution (Mw/Mn) of the polymer C within the above range, the hot-melt adhesive composition which is more superior in hot-melt properties, initial tackiness and cross-linkability can be obtained.

The vinyl bond content in the conjugated diene monomer unit of the polymer C (in the total conjugated diene monomer unit constituting the polymer C, the ratio occupied by the 1,2-vinyl bond and the 3,4-vinyl bond) can be the same as the vinyl bond content in the conjugated diene monomer unit in the block copolymer A.

The content of the polymer C in the block copolymer composition is preferably within a range of 60% by mass or less, more preferably within a range of 0 to 40% by mass, still more preferably within a range of 0 to 20% by mass, further still more preferably within a range of 0 to 10% by mass, particularly preferably within a range of 0.5 to 10% by mass, and most preferably within a range of 1 to 10% by mass, when the total mass of the block copolymer composition is set to 100% by mass. By setting the content of the polymer C in the block copolymer composition within the above range, the hot-melt adhesive composition which is more superior in hot-melt properties, initial tackiness and cross-linkability can be obtained.

The polymer C usually has the same structure as the branched chain represented by $D^2$ constituting the block copolymer A, but may have a different structure.

According to the method for producing the block copolymer A of the present invention described later, the structure of the polymer C can be generally the same as that of the branched chain represented by $D^2$ constituting the block copolymer A.

The polymer C constituting the block copolymer composition of the present invention may be composed of only one kind of polymer C having a substantially single configuration, or may be composed of two or more kinds of polymers C having substantially different configurations.

(2-4) Block Copolymer Composition

The block copolymer composition of the present invention contains at least the block copolymer A, and may optionally contain the diblock copolymer B, or may optionally contain the polymer C.

The total content of the diblock copolymer B and the polymer C in the block copolymer composition is preferably within a range of 60% by mass or less, more preferably within a range of 0 to 40% by mass, still more preferably within a range of 0 to 20% by mass, further still more preferably within a range of 0 to 10% by mass, particularly preferably within a range of 0.5 to 10% by mass, and most preferably within a range of 1 to 10% by mass, when the total mass of the block copolymer composition is set to 100% by mass. By setting the total content of the diblock copolymer B and the polymer C in the block copolymer composition within the above range, the hot-melt adhesive composition which is more superior in hot-melt properties, initial tackiness and cross-linkability can be obtained.

Here, the content of the block copolymer A/diblock copolymer B/polymer C in the block copolymer composition is preferably 10 to 100/0 to 60/0 to 30 (% by mass), preferably 30 to 100/0 to 50/0 to 20 (% by mass), preferably 30 to 99/0.5 to 50/0.5 to 20 (% by mass), preferably 50 to 99/0.5 to 40/0.5 to 10 (% by mass), and preferably 60 to 98/1 to 30/1 to 10 (% by mass), when the total mass of the block copolymer composition is set to 100% by mass. The content of the block copolymer A/diblock copolymer B/polymer C in the block copolymer composition is more preferably 70 to 98/1 to 20/1 to 10 (% by mass), still more preferably 75 to 98/1 to 15/1 to 10 (% by mass), and particularly preferably 80 to 98/1 to 10/1 to 10 (% by mass).

The block copolymer composition of the present invention may further contain a block copolymer D other than the block copolymer A, the diblock copolymer B, and the polymer C within a range not hindering the effect of the present invention.

Examples of such a block copolymer D include, but are not limited to, a block copolymer having a configuration different from that of the block copolymer A such as a block copolymer in which "m" is an integer of 3 or more and "n" is 0 in the general formula (I), and a block copolymer in which "m" is 2 and "n" is 0 in the general formula (I).

The content of the block copolymer D in the block copolymer composition is preferably 20% by mass or less, more preferably 10% by mass or less, and still more preferably 5% by mass or less, when the total mass of the block copolymer composition is set to 100% by mass. By setting the content of the block copolymer D in the block copolymer composition within the above range, the hot-melt adhesive composition which is more superior in hot-melt properties, initial tackiness and cross-linkability can be obtained.

The content of the aromatic monovinyl monomer unit in the block copolymer composition, that is, the ratio of the aromatic monovinyl monomer unit to the total amount of the block copolymer in the block copolymer composition containing the block copolymer A, the optional diblock copolymer B, the optional polymer C and the optional block copolymer D, in other words, the ratio of the aromatic monovinyl monomer unit to the entire block copolymer component of the block copolymer composition (sometimes referred to as "total aromatic monovinyl monomer unit content" in the following description) is preferably within a range of 5 to 40% by mass, more preferably within a range of 5 to 35% by mass, and still more preferably within a range of 6 to 30% by mass particularly preferably within a range of 8 to 28% by mass, and most preferably within a range of 9 to 26% by mass. By setting the content of the total aromatic monovinyl monomer unit within the above range, it is possible to improve the holding force of the obtained hot-melt adhesive composition as an adhesive and to improve the adhesiveness and flexibility.

The total aromatic monovinyl monomer unit content can be easily controlled by adjusting the blending amount of each polymer in consideration of the content of the aromatic monovinyl monomer unit of each polymer constituting the block copolymer composition. When all the polymer components which constitute a block copolymer composition are constituted only by the aromatic monovinyl monomer unit and the conjugated diene monomer unit, according to the method described in Rubber Chem. Technol., 45, 1295 (1972), by ozonizing the polymer component and then reduced by lithium aluminum hydride, the conjugated diene monomer unit portion is decomposed and only the aromatic monovinyl monomer unit portion can be taken out, so that the entire aromatic monovinyl monomer unit content can be easily measured.

The vinyl bond content in the conjugated diene monomer unit in the block copolymer composition (in the block copolymer composition containing the block copolymer A, the optional diblock copolymer B, the optional polymer C and the optional block copolymer D) (in the total conjugated diene monomer unit constituting the block copolymer composition, the ratio occupied by the 1,2-vinyl bond and the 3,4-vinyl bond) is preferably within a range of 1 to 20% by mass, more preferably within a range of 1 to 15% by mass, and particularly preferably within a range of 1 to 10% by mass. If this vinyl bond content is too high, the obtained hot-melt adhesive composition becomes too hard, which may result in inferior adhesive strength.

The weight average molecular weight (Mw) of the entire block copolymer composition, that is, the weight average molecular weight (Mw) of the entire block copolymer composition containing the block copolymer A, the optional diblock copolymer B, the optional polymer C and the optional block copolymer D, is preferably within a range of 300000 to 800000, more preferably within a range of 320000 to 750000, and still more preferably within a range of 340000 to 700000. By setting the weight average molecular weight (Mw) of the entire block copolymer composition within the above range, the hot-melt adhesive composition which is more superior in hot-melt properties, initial tackiness and cross-linkability can be obtained.

The molecular weight distribution represented by the ratio (Mw/Mn) of the weight average molecular weight (Mw) and the number average molecular weight (Mn) of the entire block copolymer composition is preferably within a range of 1.01 to 2.50, more preferably within a range of 1.02 to 2.20, and still more preferably within a range of 1.02 to 2.0.

The melt index of the entire block copolymer composition is preferably within a range of 0.5 to 50 g/10 min, more preferably within a range of 1 to 35 g/10 min, and still more preferably within a range of 2 to 25 g/10 min, as measured according to ASTM D1238 (G condition, 200° C., 5 kg load). By setting the melt index of the entire block copolymer composition within the above range, the hot-melt adhesive composition which is more superior in hot-melt properties, initial tackiness and cross-linkability can be obtained.

3. Method for Producing Block Copolymer a and Block Copolymer Composition

The method for producing the block copolymer A of the present invention is not particularly limited, and examples thereof include a method for producing the block copolymer A as one component of the block copolymer composition when the block copolymer composition is produced by a method for producing a block copolymer composition. As such a method for production, for example, a method for producing the block copolymer composition containing the block copolymer A described below can be mentioned.

That is, suitably mentioned is a method for production comprising:
  a polymerization step of polymerizing an aromatic monovinyl monomer in a polymerization solvent using an organolithium initiator to obtain an aromatic monovinyl polymer block chain;
  a polymerization step of polymerizing a conjugated diene monomer in a polymerization solvent using an organolithium initiator in the presence of the aromatic monovinyl polymer block chain to obtain a diblock chain and a conjugated diene polymer block chain; and
  a coupling step of reacting the diblock chain and the conjugated diene polymer block chain with a polyfunctional coupling agent.

(Polymerization Step)

The organolithium initiator used in the polymerization step can be any known organolithium initiator that can initiate the polymerization of the aromatic monovinyl monomer and the conjugated diene monomer. Specific examples thereof include organic monolithium initiators such as methyl lithium, n-propyl lithium, n-butyl lithium, sec-butyl lithium, and the like. Among these, n-butyl lithium is preferred. The amount of the organolithium initiator to be used may be determined by calculation according to the desired molecular weight of the polymer by a method known to persons skilled in the art. In the present invention, by using the organolithium initiator, since the polymerization reaction proceeds with living property, a polymer having an active end is present in the polymerization reaction system. Therefore, in the present invention, it is possible to make the polymer chain obtained in the polymerization step have an active end.

As the polymerization solvent, any polymerization solvent inert to the organolithium initiator can be used without limitation, open-chain hydrocarbon solvents, cyclic hydrocarbon solvents, and mixture thereof can be used. Examples of the open-chain hydrocarbon solvents include open-chain alkanes and alkenes having 4 to 6 carbon atoms such as n-butane, isobutane, n-hexane or mixtures thereof; 1-butene, isobutylene, trans-2-butene, cis-2-butene or mixtures thereof; 1-pentene, trans-2-pentene, cis-2-pentene or mixtures thereof; n-pentane, isopentane, neo-pentane or mixtures thereof; and 1-pentene, trans-2-pentene, cis-2-pentene or mixtures thereof. Examples of the cyclic hydrocarbon solvents include aromatic hydrocarbons such as benzene, toluene, and xylene; alicyclic hydrocarbons such as cyclohexane; and the like. To control the polymerization temperature and the molecular weight distribution, use of mixtures of the open-chain hydrocarbon solvents with the cyclic hydrocarbon solvents is preferred. These are used in a mass ratio "open-chain hydrocarbon solvent:cyclic hydrocarbon solvent" of more preferably 5:95 to 50:50, still more preferably 10:90 to 40:60.

The polymerization reaction can also be performed in the presence of a polar compound. Use of the polar compound allows adjustment of the polymerization initiation rate and the molecular weight distribution. Examples of the polar compound include aromatic or aliphatic ethers or tertiary amines having a relative permittivity (25° C.) of 2.5 to 5.0. Specific examples of the polar compounds include aromatic ethers such as diphenyl ether and anisole; aliphatic ethers such as diethyl ether and dibutyl ether; tertiary monoamines such as trimethyl amine, triethylamine, and tripropylamine; tertiary polyamines such as tetramethylethylenediamine and tetraethylethylenediamine; and the like. These polar compounds may be used alone or in combination. The polar compound is used in an amount of preferably 0.001 to 50 mol, more preferably 0.005 to 10 mol with respect to 1 mol of the organolithium initiator.

A method for polymerizing the aromatic monovinyl monomer is not particularly limited, and any of the commonly used methods such as batch polymerization in which the total amount of the aromatic monovinyl monomer and the total amount of the initiator are collectively charged into a polymerization system and reacted, continuous polymerization in which these are reacted while being continuously supplied to a polymerization system, and a method in which a polymerization is carried out using a part of a monomer and a part of an initiator to a predetermined conversion rate and then a remaining monomer and a remaining initiator are added to continue polymerization may be used. Polymerization is usually carried out within a range of 0° C. to 90° C., preferably 20° C. to 80° C. If it is difficult to control the reaction temperature, it is preferable to perform temperature control by reflux cooling using a reaction vessel in which a reflux type condenser is installed.

Under the above conditions, by polymerizing the aromatic monovinyl monomer using the organolithium initiator in the solvent, a solution containing an aromatic monovinyl polymer block chain can be obtained. Note that, the aromatic monovinyl polymer block chain obtained by polymerization is usually one having an active end. Since the obtained aromatic monovinyl polymer block chain forms the aromatic monovinyl polymer block ($Ar^1$) or the aromatic monovinyl polymer block ($Ar^3$), the amount of monomer used in this polymerization step may be determined according to the weight average molecular weight of the aromatic monovinyl polymer block ($Ar^1$) and the aromatic monovinyl polymer block ($Ar^3$).

Then, the organolithium initiator and the conjugated diene monomer are added to the solution containing the obtained aromatic vinyl polymer block chain, and polymerization is performed. Thus, a solution containing a diblock chain and a conjugated diene polymer block chain can be obtained. Note that, the diblock chain and the conjugated diene polymer block chain obtained by polymerization usually have an active end. The obtained diblock chain forms one where a polymer chain forming a conjugated diene polymer block ($D^1$) or a conjugated diene polymer block ($D^3$) is bonded to a polymer chain forming an aromatic monovinyl polymer block ($Ar^1$) and an aromatic monovinyl polymer block ($Ar^3$). In addition, the obtained conjugated diene polymer block forms the conjugated diene polymer block ($D^2$) and polymer C. Therefore, the amount of the monomer used in this polymerization step may be determined according to the weight average molecular weight of the conjugated diene polymer block ($D^1$), conjugated diene polymer block ($D^2$), the conjugated diene polymer block ($D^3$) and polymer C. In addition, the polymerization reaction temperature and the polymerization pressure may be controlled within the same range as that of the polymerization of the aromatic monovinyl monomer. Further, at the time of polymerization of the conjugated diene monomer, the above-described polar compound may be used as a randomizer to adjust the vinyl bond content in the conjugated diene monomer unit.

(Coupling Step)

The multifunctional coupling agent is then added to the solution containing the diblock chain and the conjugated diene polymer block chain. Thus, the active end possessed by the diblock chain and the conjugated diene polymer block chain and the polyfunctional coupling agent react with each other, so that three or more branched chains are bonded via residues of the polyfunctional coupling agent to form the block copolymer A. As the polyfunctional coupling agent, those described above can be used. It is also possible to add a compound having an action of promoting the coupling reaction.

The amount of the polyfunctional coupling agent to be used is adjusted to an appropriate amount depending on the number of branched chains of the block copolymer A and the content of the block copolymer A in the block copolymer composition. The amount of the polyfunctional coupling agent to be used is preferably within a range of 0.0001 to 20 mol, more preferably within a range of 0.01 to 10 mol, and still more preferably within a range of 0.02 to 6 mol, with respect to 1 mol of the organolithium initiator. By setting the amount of the polyfunctional coupling agent to be used in the above range, by-products of the polymer component other than the block copolymer A can be suppressed, and a block copolymer composition containing the target block copolymer A can be easily obtained.

The appropriate amount of the polyfunctional coupling agent to be used can be determined by calculation depending on the number of branched chains of the target block copolymer A and the content of the block copolymer A in the block copolymer composition, but in an actual polymerization reaction, deactivation of the organolithium initiator or the polyfunctional coupling agent occurs, and therefore, a preliminary experiment is performed to obtain an optimum value. Further, if necessary, a reaction terminator such as methanol can be used to adjust the coupling ratio. Further, by adjusting the amount of the polyfunctional coupling agent to be used, by using a reaction terminator, or the like, the diblock chain and the conjugated diene polymer block chain obtained in the polymerization step may be left unreacted and finally may be recovered as the diblock copolymer B and the polymer C.

The reaction temperature is preferably 10 to 150° C., more preferably 30 to 130° C., and still more preferably from 40 to 90° C. The time required for the reaction varies depending on the conditions, but is usually within 48 hours, preferably 0.5 to 10 hours.

After the reaction step, the polymer component may be recovered from a solution containing the block copolymer composition containing the block copolymer A, the optional diblock copolymer B and the optional polymer C (recovery step). The method of recovery may be performed according to a conventional method, and is not particularly limited. For example, after completion of the reaction, if necessary, a polymerization terminator such as water, methanol, ethanol, propanol, hydrochloric acid, and citric acid is added, and if necessary, an additive such as an antioxidant is further added, and then a known method such as a directly drying method and a steam stripping is applied to the solution to be recovered. When the polymer component is recovered as a slurry by applying steam stripping or the like, the polymer component may be dehydrated using an arbitrary dehydrator such as an extruder type squeezer to obtain a crumb having a moisture content of a predetermined value or less, and the crumb may be dried using an arbitrary dryer such as a band dryer and an expansion extruder. The block copolymer obtained as described above may be processed into a pellet shape or the like according to a conventional method and then used.

As described above, the block copolymer composition containing the block copolymer A can be produced.

Note that, although the block copolymer composition of the present invention can be produced collectively by the above production method, it may be produced by preparing the block copolymer A and optionally mixing it with the diblock copolymer B, the polymer C, and the block copolymer D separately prepared.

4. Hot-Melt Adhesive Composition

The hot-melt adhesive composition of the present invention contains 100 parts by mass of the block copolymer A or 100 parts by mass of the block copolymer composition, 25 to 400 parts by mass of a tackifying resin, 0.01 to 50 parts by mass of a cross-linking agent, and 0 to 200 parts by mass of a plasticizer.

Since the hot-melt adhesive composition of the present invention contains the block copolymer A or the block copolymer composition, it is excellent in hot-melt properties, initial tackiness and cross-linkability.

(4-1) Tackifying Resin

As the tackifying resin used in the present invention, a conventionally known tackifying resin can be used. Specifically, examples of the tackifying resin include rosin; modified rosins such as disproportionated rosin, dimerized rosin; ester products of polyvalent alcohols such as glycol, glycerin, and pentaerythritol and rosin or modified rosin; terpene-based resins; hydrocarbon resins of aliphatic resin, aromatic resin, alicyclic resin or aliphatic-aromatic copolymer-based resin or hydrides thereof; phenolic resins; coumarone-indene resins and the like. The tackifying resin particularly preferably used is an aliphatic or aliphatic-aromatic copolymer-based hydrocarbon resin having good miscibility with the polymer component used in the present invention.

One kind of tackifying resin may be used alone, or two or more kinds thereof may be used in combination.

The amount of the tackifying resin to be blended is within a range of 25 to 400 parts by mass, preferably within a range of 50 to 350 parts by mass, and more preferably within a range of 60 to 300 parts by mass, with respect to 100 parts by mass of the block copolymer A or 100 parts by mass of the block copolymer composition.

(4-2) Cross-Linking Agent

The cross-linking agent used in the present invention may be a known cross-linking agent used in a hot-melt adhesive composition. Representative cross-linked systems include peroxide cross-linking systems, sulfur cross-linking systems and photo-crosslinking systems.

The peroxide cross-linking system includes a peroxide-based cross-linking agent. Examples of the peroxide-based cross-linking agent include, t-butylhydroperoxide, cumene hydroperoxide, dicumylperoxide, di-t-butylperoxide, t-butylcumylperoxide, 2,5-dimethyl-t-butylperoxyhexane, 2,5-dimethyl-t-butylperoxyhexine, 1,3-bis(t-butylperoxyisopropyl)benzene, p-chlorobenzoyl peroxide, t-butylperoxybenzoate, t-butylperoxyisopropylcarbonate, t-butylbenzoate, and the like.

In addition, in the peroxide cross-linking system, a polyfunctional unsaturated compound is used as a vulcanization aid in combination, in addition to these peroxide-based cross-linking agents. Examples of the polyfunctional unsaturated compound include trimethylol propane trimethacrylate, divinyl benzene, ethylene dimethacrylate, polyethylene glycol dimethacrylate, triallyl isocyanurate, triallyl cyanurate, diallyl phthalate, diallyl itaconate, and triallyl trimellitate.

The sulfur cross-linking system includes a sulfur-based cross-linking agent. Examples of the sulfur-based cross-linking agent include sulfurs such as powdered sulfur, sulfur hue, precipitated sulfur, colloidal sulfur, surface-treated sulfur, and insoluble sulfur; sulfur compounds such as sulfur chloride, sulfur dichloride, morpholine disulfide, alkylphenol disulfide, N,N'-dithio bis(hexahydro-azepinone-2), phosphorus-containing polysulfide, and polymer polysulfide; tetramethylthiuram disulfide, selenium dimethyldithiocarbamate, and 2-(4'-morpholinodithio)benzo thiazole. Further, in the sulfur cross-linking system, in addition to these sulfur-based cross-linking agents, stearic acid; sulfur vulcanization accelerators such as guanidine-based, aldehyde-amine-based, aldehyde-ammonia-based, thiazole-based, sulfenamide-based, thiourea-based, xanthate-based can be used in combination.

The photo cross-linking system can be any single compound, or combination of compounds which can produce a free radical in response to light such as ultraviolet (UV) so that a polymerization of one or more monomers can be initiated without undue termination reaction. As known photo-crosslinking systems, in particular, free radical photoinitiator such as a quinones, benzophenone, benzoin ether, allyl ketones, peroxide, biimidazole, benzyl dimethyl ketal, hydroxyalkyl phenylacetones, dialkoxy acetophenones, trimethylbenzoylphosphine oxide derivatives, amino ketones, benzoyl cyclohexanol, methyl thiophenyl morpholino ketones, morpholino phenyl amino ketones, alpha-halogenoacetophenones, oxysulfonyl ketones, sulfonyl ketones, oxysulfonyl ketones, sulfonyl ketones, benzoyloxime esters, thioxanthone, camphorquinone, ketocoumarin, and Michler's ketone can be used. Alternatively, the photo cross-linking system may be a mixture of compounds that give a free radical when one of them is triggered by a sensitizer activated by radiation. It is preferable that the photo cross-linking system is one that is sensitive to visible light or ultraviolet (actinic radiation).

In addition, in the photo cross-linking system, together with the free radical photo initiator, the above-described polyfunctional unsaturated compound can also be used in combination.

The cross-linking agent used in the present invention is not limited to the cross-linking agent described above, and may be one capable of cross-linking the hot-melt adhesive composition in response to an active energy ray such as an electron beam and radiation.

The amount of the cross-linking agent to be blended is within a range of 0.01 to 50 parts by mass, preferably within a range of 0.01 to 20 parts by mass, and more preferably within a range of 0.01 to 10 parts by mass, with respect to 100 parts by mass of the block copolymer A or 100 parts by mass of the block copolymer composition.

(4-3) Plasticizer

As the plasticizer, any plasticizer can be used without limitation, and organic compounds which are in a liquid state at room temperature (23° C.) are suitably used. The type of the plasticizer is not particularly limited as long as it exhibits compatibility with the block copolymer A or the block copolymer composition, and specifically, an aromatic, paraffinic or naphthenic process oil added to an ordinary hot-melt adhesive composition; a liquid polymer such as polybutene, and polyisobutylene, or the like can be used. Among them, a paraffinic process oil or a naphthenic process oil is particularly suitable. As the plasticizer, one kind may be used alone, or two or more kinds may be used in combination.

The amount of the plasticizer to be blended is within a range of 0 to 200 parts by mass, preferably within a range of 1 to 150 parts by mass, and more preferably within a range of 2 to 100 parts by mass, with respect to 100 parts by mass of the block copolymer A or 100 parts by mass of the block copolymer composition. By setting the compounding amount of the plasticizer within this range, excellent viscosity properties can be achieved while bleed is prevented.

(4-4) Other Ingredients

The hot-melt adhesive composition of the present invention may contain a polymer other than the above-mentioned essential component. Examples of such polymers include, but are not limited to, polymers having elasticity at room temperature (23° C.) such as conjugated diene homopolymers such as polybutadiene and polyisoprene, aromatic vinyl-conjugated diene random copolymers such as (styrene-butadiene) random copolymers, and (styrene-isoprene) random copolymers, aromatic vinyl homopolymers such as polystyrene, isobutylene-based polymers, acrylic polymers, ester-based polymers, ether-based polymers, urethane-based polymers, polyvinyl chloride. In the hot-melt adhesive composition of the present invention, the blending amount of these polymers is preferably 20 parts by mass or less, more preferably 10 parts by mass or less, with respect to 100 parts by mass of the block copolymer composition.

In addition, an antioxidant may be added to the hot-melt adhesive composition of the present invention if necessary. The type thereof is not particularly limited, and for example, hindered phenolic compounds such as pentaerythritol tetrakis[3-(3,5-di-t-butyl-4-hydroxyphenyl)propionate], octadecyl-3-(3,5-di-t-butyl-4-hydroxyphenyl)propionate, 2,6-di-t-butyl-p-cresol, di-t-butyl-4-methylphenol; thiodicarboxylate esters such as dilaurylthiopropionate; phosphites such as tris(nonylphenyl)phosphite; can be used. The amount of the antioxidant to be blended is not particularly limited, but is preferably within a range of 10 parts by mass or less, and more preferably within a range of 0.5 to 5 parts by mass, with respect to 100 parts by mass of the block copolymer A or 100 parts by mass of the block copolymer composition. As the antioxidant, one kind may be used alone, or two or more kinds may be used in combination.

The hot-melt adhesive composition according to the present invention may further contain other compounding agents such as wax, a heat stabilizer, an ultraviolet absorbing agent, a filler, and the like. The hot-melt adhesive composition according to the present invention is preferably a solvent-free composition which does not contain any solvent.

(4-5) Hot-Melt Adhesive Composition

In obtaining the hot-melt adhesive composition of the present invention, a method of mixing the block copolymer A or the block copolymer composition and other components is not particularly limited, and examples thereof include a method in which each component is dissolved in a solvent and heat mixed, and then the solvent is removed by heating or the like, and a method in which each component is melt-mixed by a kneader or the like. From the viewpoint of more efficiently performing mixing, melt mixing is suitable among these methods. The temperature at the time of performing melt mixing is not particularly limited, but is usually within a range of 100 to 200° C.

With respect to the cross-linkability of the hot-melt adhesive composition of the present invention, it is desirable that 20% or more of the block copolymer A or the block copolymer composition is set so as to have a high molecular weight after cross-linking the hot-melt adhesive composition. When the block copolymer composition has cross-linkability as described above, the adhesive composition excellent in heat resistance stability, adhesiveness at high temperature and initial tackiness can be obtained.

In the dynamic viscoelasticity measurements of the hot-melt adhesive composition after cross-linking (adhesive composition), it is preferable that the elastic modulus (G') in the rubbery area does not exceed $1.0 \times 10^7$ MPa.

In order to obtain an appropriate cross-linkability, the cross-linkability may be appropriately adjusted by selecting the vinyl bond content in the conjugated diene monomer unit in the block copolymer A or the block copolymer composition, the type and amount of the compounding component such as the cross-linking agent, and the irradiation amount of the active energy ray such as the light to be irradiated, and the like.

When ultraviolet rays are used as the active-energy rays, it is preferable to use ultraviolet light sources such as a high-pressure mercury lamp, a low-pressure mercury lamp, an excimer laser, and a metal halide lamp, and to select the radiation dose within a range of usually 0.03 to 5 J/cm². At this time, if necessary, a filter which cuts ultraviolet rays on the short wavelength side, a Pyrex (registered trademark) glass, or a polyester sheet may be used. Further, the temperature at the time of ultraviolet irradiation is not particularly limited, and a heating condition from room temperature to 180° C. can be selected. Ultraviolet rays can be irradiated, for example, to a layer obtained by applying the hot-melt adhesive composition to a substrate.

5. Adhesive Composition

The hot-melt adhesive composition of the present invention contains the block copolymer composition, the tackifying resin, the cross-linking agent, and the plasticizer as essential components. By cross-linking such a hot-melt adhesive composition, the adhesive composition of the present invention can be obtained.

In the adhesive composition of the present invention, the block copolymer A or the block copolymer composition contained in the hot-melt adhesive composition is cross-linked.

In the adhesive composition of the present invention, 20% by mass or more of the block copolymer A or the block copolymer composition contained in the hot-melt adhesive composition is preferably cross-linked from the viewpoint that the adhesive composition can be made more excellent in heat resistance stability and adhesiveness at high temperature. In particular, since the hot-melt adhesive composition of the present invention has excellent hot-melt properties and initial tackiness, and also has excellent cross-linkability, it is possible to make the cross-linking ratio of the block copolymer contained in the hot-melt adhesive composition relatively high as described above even with a relatively small amount of energy, and to obtain an adhesive composition containing a large amount of cross-linking sites.

The hot-melt adhesive composition and the adhesive composition of the present invention can be used in any application (to any object to be bonded) without limitation, and can be used in a variety of bonding applications where hot-melt adhesives can be used. Among these, these are particularly suitably used as so-called adhesive tapes obtained by hot-melt applying the hot-melt adhesive composition on a film-shaped substrate. For example, after melted by heating, the hot-melt adhesive composition of the present invention can be melt applied to the substrate; and before the adhesive composition completely solidifies, an object made of the same or different material as or from that for the substrate can be bonded thereto by press bonding. At this time, the hot-melt adhesive composition can also be cross-linked into the adhesive composition. The hot-melt adhesive composition of the present invention, which has excellent hot-melt properties, contributes to a reduction in rejection rate and an improvement in productivity in manufacturing of such tapes. In addition, the obtained tape becomes excellent in initial tackiness, and when the hot-melt adhesive composition is cured, it becomes excellent in heat resistance stability, adhesiveness at high temperature and initial tackiness. The hot-melt adhesive composition and the adhesive composition of the present invention can also be suitably used for hygienic products such as disposable paper diapers and sanitary napkins; food packaging such as frozen foods, fresh foods, and confectionery; member packaging such as automotive parts, and mechanical parts; electrical product packaging such as televisions, audio products, and refrigerators; bookbinding applications such as slips, books, and force talogs; bag making applications such as kraft bags, polypropylene bags, and polyethylene bags; clothing applications such as soffing of coats, leather and fabric bonding, and core bonding; and the like.

The hot-melt adhesive composition and the adhesive composition of the present invention are also applicable to the production of labels. It is preferable that the label comprises an adhesive layer composed of the hot-melt adhesive composition or the adhesive composition of the present invention and a support. The adhesive layer can usually be formed by applying the hot-melt adhesive composition or the adhesive composition of the present invention on the support and drying it.

The support used is not particularly limited, and examples thereof include papers such as kraft paper, Japanese paper, quality paper and synthetic paper; fabrics such as cotton cloth, spun cloth and polyester cloth; resin films such as cellophane film, polyvinyl chloride film, polypropylene film and polyethylene film; metal foils such as aluminum foil and copper foil; nonwoven fabrics such as polyester nonwoven fabric and rayon nonwoven fabric. These supports may be those in which the surface thereof is subjected to a corona discharge treatment or a primary coating agent is applied in advance.

The label obtained using the hot-melt adhesive composition or the adhesive composition of the present invention may be one which has been cut into an appropriate shape, punched, or the like, depending on its use application. Further, the adhesive layer possessed by the label using the hot-melt adhesive composition or the adhesive composition of the present invention is not limited to a continuously formed one. For example, it may be an adhesive layer formed in a regular or random pattern, such as a punctate, a stripe, or the like.

The present invention is not limited to the above embodiment. The above-described embodiments are illustrative, have substantially the same constitution as the technical idea described in the claims of the present invention, and any of them having the same operation and effect is included in the technical scope of the present invention.

EXAMPLES

Hereinafter, the present invention will now be more specifically described by way of Examples and Comparative Examples. In the Examples and Comparative Examples, "parts" and "%" are mass-based unless otherwise specified.

Various kinds of measurements were carried out according to the following method.

[Weight Average Molecular Weight and Molecular Weight Distribution]

High performance liquid chromatography was performed using tetrahydrofuran at a flow rate of 0.35 ml/min as a carrier to determine the molecular weight, which was calibrated against polystyrene standards. The apparatus used was HLC8220 available from Tosoh Corporation provided with three Shodex (Registered trademark) KF-404HQ columns (available from Showa Denko K.K.) connected in series (column temperature: 40° C.). The detectors used were a differential refractometer and an ultraviolet detector. The molecular weight was calibrated at 12 points of the standard polystyrenes (500 to 3000000) available from Polymer Laboratories Ltd.

[Contents of Block Copolymers in Block Copolymer Composition]

It was determined from the area ratio of the peak corresponding to each block copolymer of the chart obtained by high performance liquid chromatography described above.

[Weight Average Molecular Weight of Styrene Polymer Block of Block Copolymer]

According to the process described in Rubber Chem. Technol., 45, 1295 (1972), the block copolymer was reacted with ozone and reduced with lithium aluminum hydride to decompose the isoprene polymer block of the block copolymer. Specifically, the following procedure was performed. That is, 300 mg of the sample was dissolved in a reaction vessel containing 100 ml of dichloromethane treated with molecular sieves. This reaction vessel was placed in a cooling tank and cooled to −25° C., and ozone generated by an ozone generator was introduced while oxygen was flowed into the reaction vessel at a flow rate of 170 ml/min. After 30 minutes from the start of the reaction, it was confirmed that the reaction was completed by introducing the gas flowing out of the reaction vessel into the aqueous potassium iodide solution. Then, 50 ml of diethyl ether and 470 mg of lithium aluminum hydride were charged into another reaction vessel subjected to nitrogen substitution, and a solution reacted with ozone was slowly added dropwise to this reaction vessel while cooling the reaction vessel with ice water. Then, the reaction vessel was placed in a water bath, and the temperature was gradually increased to reflux at 40° C. for 30 minutes. Thereafter, while stirring the solution, dilute hydrochloric acid was added dropwise in small portions to the reaction vessel, and dropping was continued until the generation of hydrogen was hardly recognized. After this reaction, the solid product formed in the solution was filtered off and the solid product was extracted with 100 ml of diethyl ether for 10 minutes. The extracted liquid was combined with the filtrate after filtration, and the solvent was distilled off to obtain a solid sample. With respect to the sample thus obtained, the weight average molecular weight was measured according to the method of measuring the weight average molecular weight described above, and the value thereof was defined as the weight average molecular weight of the styrene polymer block.

[Weight Average Molecular Weight of Isoprene Polymer Block of Block Copolymer]

From the weight average molecular weight of the block copolymer determined as described above, the weight average molecular weight of the corresponding styrene polymer block was subtracted, and the weight average molecular weight of the isoprene polymer block was determined based on the calculated value.

[Ratio of Mass of Branched Chain in Block Copolymer $(Ar^1-D^1)/D^2)$]

2 mL of the polymer solution prior to the coupling step was collected and mixed with 1 ml of excess methanol to deactivate the polymerization activity. This sample was analyzed by high performance liquid chromatography, and the ratio $(Ar^1-D^1)/D^2)$ of the mass of branched chains in the block copolymer was determined from the area ratio of the peaks in the obtained charts.

[Weight Average Molecular Weight Ratio $(D^1/D^2)$ of Isoprene Polymer Block in Block Copolymer]

In the same manner as above, the sample collected prior to the coupling step was analyzed by high performance liquid chromatography to determine the weight average molecular weights of $Ar^1-D^1$ and $D^2$, and then the weight average molecular weight of the styrene polymer block obtained by the above method was subtracted so that $D^1/D^2$ was determined.

[Styrene Unit Content of (Entire) Block Copolymer Composition]

It was determined based on the measurement of proton NMR.

[Melt Index of Block Copolymer Composition]

It was measured according to ASTM D1238 (condition G, 200° C., load: 5 kg).

Example 1

1. Preparation of Block Copolymer Composition

Using a 2 liter pressure-resistant reactor, 400 g of a mixed solvent at a ratio of n-butane/cyclohexane=30/70, 0.07 mmol of tetramethylethylenediamine, and 1.75 mmol of n-butyl lithium as an initiator were present, and 22 g of styrene was added to polymerize at 30° C. for 1 hour. Subsequently, 0.75 mmol of n-butyl lithium and 78 g of isoprene were added to polymerize for about one and half hours with temperature control by reflux cooling so that the reaction temperature was between 50° C. and 60° C. The coupling reaction was then carried out for 2 hours with the addition of divinyl benzene (DVB) as a coupling agent in an amount of 4-fold equivalent to total n-butyl lithium. After this, 1 ml of methanol as a polymerization terminator and 0.05 g of 2,6-di-butyl-p-cresol as an antioxidant were added to the reaction mixture to mix well, and then the obtained mixed solution was added dropwise into hot water heated to 85 to 95° C. in small portions to volatilize the solvent. The obtained polymer was ground and hot air dried at 85° C. to obtain a block copolymer composition.

The styrene content of the entire block copolymer composition was 22%, the weight average molecular weight (Mw) in terms of polystyrene was 433,000, the vinyl bond content was 7%, and the melt index (G condition) was 10 g/10 min.

The molecular weight distribution (Mw/Mn) of the block copolymer A in the block copolymer composition was 1.10, and the content of the block copolymer A in the block copolymer composition was 95%.

The molecular weight distribution (Mw/Mn) of the diblock copolymer B in the block copolymer composition was 1.01, and the content of the diblock copolymer B in the block copolymer composition was 4%.

The molecular weight distribution (Mw/Mn) of the polymer C in the block copolymer composition was 1.01, and the content of the polymer C in the block copolymer composition was 1%.

2. Preparation of Hot-Melt Adhesive Composition 100 parts of the above block copolymer composition were put into a stirring blade type kneader, 110 parts of a tackifying resin (Quintone R100; aliphatic hydrocarbon resin, manufactured by Zeon Corporation), 10 parts of naphthenic process oil (Shellflex 371, manufactured by Shell Chemicals) as a plasticizer, 0.5 parts of a photocurable monomer (trimethylolpropane triacrylate), 2.5 parts of a cross-linking agent (2,2-dimethoxy-1,2-diphenylethane-1-on, Irgacure 651, manufactured by BASF SE), 2.5 parts of an antioxidant (Irganox 1010, manufactured by BASF SE), and 1 part of an antioxidant (Irgafos 168, manufactured by BASF SE) were added thereto, and the inside of kneading system was replaced with nitrogen gas, followed by kneading at 160° C. for 1.5 hours to prepare a hot-melt adhesive composition. The obtained hot-melt adhesive composition was evaluated by the following method. The results are shown in Table 1.

[Evaluation of Producing Adhesive in Hot-Melt]

10 g of the hot-melt adhesive composition was collected, and the melt viscosity (unit: mPa·s) at 180° C. was measured by a thermocell type Brookfield viscometer using a rotor No. 27. When the value of the melt viscosity was 500,000 mPa·s or less, it was evaluated as "Good" because it was excellent in hot-melt property and easy to produce an adhesive in hot-melt, and on the other hand, when the value of the melt viscosity was more than 500,000 mPa·s, it was evaluated as "Poor" because it was inferior in hot-melt properties.

[Cross-Linkability of Hot-Melt Adhesive Composition]

The hot-melt adhesive composition was cross-linked by irradiating light under 0.2 J/cm² conditions under a metal halide lamp to obtain an adhesive composition. Then, the cross-linkability was evaluated by performing measurement by high performance liquid chromatography on the hot-melt adhesive composition before cross-linking and the adhesive composition after cross-linking. By contrasting the peaks derived from the block copolymer A contained in the composition before and after cross-linking, when the block copolymer A before cross-linking became high molecular weight at a ratio of the peak area of 20% by mass or more by cross-linking, since it can be judged that the cross-linkability was excellent, it was evaluated as "Good". When it was less than 20% by mass, since cross-linkability was not sufficient, and therefore, it was evaluated as "Poor".

[Remaining Glue Test]

The hot-melt adhesive composition was melt-coated on a PET film having a thickness of 25 μm so as to have a thickness of 20 to 30 μm to obtain a coated sheet. This coated sheet was then cut to obtain a test piece before cross-linking. The test piece before cross-linking obtained in this manner was adhered to a stainless steel plate by pressure bonding using a 2 kg rubber roller under a condition of 23° C. at a speed of 300 mm/min, and a test sample which had elapsed at 100° C. for 12 hours after the adhered was used as a measurement sample. This measurement sample was peeled off at a peel speed of 15 m/min at 23° C. using a high-speed peel tester "TE-701-S" manufactured by Testers Sangyo Co., Ltd. as a measurement instrument in accordance with PSTC-1 (180° peel adhesion test by the US Adhesive Tape Commission), and the peel adhesion strength (N/m) was obtained. Further, the heat stability of the hot-melt adhesive composition before cross-linking was evaluated by visually confirming the presence or absence of glue remaining after peeling of the stainless steel plate.

The test piece before cross-linking was irradiated with UV light using a metal halide lamp under a 1.0 J/cm² condition to cross-link the hot-melt adhesive composition to obtain a test piece having an adhesive composition layer. Using the obtained test piece, the peel adhesive strength (N/m) of the adhesive composition after cross-linking was determined, and the heat resistance stability was evaluated. Specifically, those glue residue could not be visually recognized was the glue residue "none", was evaluated as "Good". On the other hand, the sample with an adhesive residue visually observed was determined as "adhesive residue present", and was evaluated as "Poor". It can be judged that the smaller the amount of residual glue is, the more excellent the heat resistance stability is.

[Shear Adhesion Failure Temperature (SAFT)]

The hot-melt adhesive composition was melt-coated on a PET film having a thickness of 25 μm so as to have a thickness of 20 to 30 μm to obtain a coated sheet. This coated sheet was then cut to obtain a test piece before cross-linking. Using the thus obtained test piece before cross-linking, the test piece was contacted with a stainless steel as an adherend so that the bonding portion became 10×25 mm, and this was subjected to pressure bonding using a 2 kg rubber roller under a condition of 23° C. at a speed of 300 mm/min to obtain a measurement sample. For this measurement sample, a load was applied as a weight of 500 g, and a shear adhesion failure temperature (SAFT) of the hot-melt adhesive composition before cross-linking was measured at a temperature rise rate of 0.5° C./min.

The test piece before cross-linking was irradiated with UV light using a metal halide lamp under a 1.0 J/cm² condition to cross-link the hot-melt adhesive composition to obtain a test piece having an adhesive composition layer. Using the obtained test pieces, the shear adhesion failure temperature (SAFT) of the adhesive composition after cross-linking was measured. It can be determined that a higher shear adhesion failure temperature (SAFT) indicates more excellent high-temperature adhesiveness (adhesiveness at high temperature).

[Loop Tack]

The hot-melt adhesive composition was melt-coated on a 25 μm PET film so as to have a thickness of 20 to 30 μm to obtain a coated sheet. This coated sheet was then cut to obtain a test piece before cross-linking. Using the test piece before cross-linking thus obtained and a stainless steel plate as an adherend, the loop tack (N/25 mm) of the hot-melt adhesive composition before cross-linking was evaluated by a tensile tester under conditions of the test rate of 300 mm/min, the adhesive portion of 25×25 mm, and a temperature of 23° C.

The test piece before cross-linking was irradiated with UV light using a metal halide lamp under a 1.0 J/cm² condition to cross-link the hot-melt adhesive composition to obtain a test piece having an adhesive composition layer. The obtained test piece was used to evaluate the loop tack of the adhesive composition after cross-linking. The larger the value, the better the initial adhesion.

Examples 2 to 6

Block copolymer compositions and hot-melt adhesive compositions were prepared in the same manner as in Example 1, except that the amount of n-butyl lithium, styrene and isoprene added was changed as described in Table 1, and evaluated in the same manner as in Example 1. The results are shown in Table 1.

Example 7

1. Preparation of Block Copolymer Composition

Using a 2 liter pressure-resistant reactor, 400 g of a mixed solvent having a ratio of n-butane/cyclohexane=30/70, 0.07 mmol of tetramethylethylenediamine, and 1.25 mmol of n-butyl lithium as an initiator were present, and 16 g of styrene was added to polymerize for 1 hour at 30° C. Subsequently, 28 g of isoprene was added to polymerize for about one and half hours with temperature control by reflux cooling so that the reaction temperature was between 50° C. and 60° C. Subsequently, 1.25 mmol of n-butyl lithium and 56 g of isoprene were added to polymerize for about one and half hours with temperature control by reflux cooling so that the reaction temperature was between 50° C. and 60° C. The coupling reaction was then carried out for 2 hours with the addition of divinyl benzene (DVB) as a coupling agent in an amount of 4-fold equivalent to total n-butyl lithium, lifter this, 1 ml of methanol as a polymerization terminator and 0.05 g of 2,6-di-butyl-p-cresol as an antioxidant were added to the reaction mixture to mix well, and then the obtained mixed solution was added dropwise into hot water heated to 85 to 95° C. in small portions to volatilize the solvent. The obtained polymer was ground and hot air dried at 85° C. to obtain a block copolymer composition. The physical properties of the obtained block copolymer composition are shown in Table 1.

2. Preparation of Hot-Melt Adhesive Composition

Using the above block copolymer composition, a hot-melt adhesive composition was prepared in the same manner as in Example 1 and evaluated in the same manner as in Example 1. The results are shown in Table 1.

Comparative Example 1

1. Preparation of Block Copolymer Composition

Using a 2 liter pressure-resistant reactor, 400 g of a mixed solvent having a ratio of n-butane/cyclohexane=30/70, 0.07 mmol of tetramethylethylenediamine, and 2.22 mmol of n-butyl lithium as an initiator were present, and 22 g of styrene was added to polymerize for 1 hour at 30° C. Subsequently, 78 g of isoprene was added to polymerize for about one and half hours with temperature control by reflux cooling so that the reaction temperature was between 50° C. and 60° C. The coupling reaction was then carried out for 2 hours with the addition of divinyl benzene (DVB) as a coupling agent in an amount of 4-fold equivalent to total n-butyl lithium. After this, 1 ml of methanol as a polymerization terminator and 0.05 g of 2,6-di-butyl-p-cresol as an antioxidant were added to the reaction mixture to mix well, and then the obtained mixed solution was added dropwise into hot water heated to 85 to 95° C. in small portions to volatilize the solvent. The obtained polymer was ground and hot air dried at 85° C. to obtain a block copolymer composition. The obtained block copolymer composition was one comprising a block copolymer D represented by the formula: $(Ar-D)_pX$ (in the formula, Ar was an aromatic monovinyl polymer block, D was a conjugated diene polymer block, "p" was an integer of 3 or more, and X was a residue of a polyfunctional coupling agent). The physical properties of the obtained block copolymer composition are shown in Table 2.

2. Preparation of Hot-Melt Adhesive Composition

Using the above block copolymer composition, a hot-melt adhesive composition was prepared in the same manner as in Example 1 and evaluated in the same manner as in Example 1. The results are shown in Table 2.

Comparative Example 2

A block copolymer composition was prepared in the same manner as in Example 1, except that the amount of n-butyl lithium added, the type of the coupling agent and the amount of the coupling agent added were changed as described in Table 2. The obtained block copolymer composition was one comprising a block copolymer D represented by the formula: $(Ar-D)_pX$ (in the formula, Ar was an aromatic monovinyl polymer block, D was a conjugated diene polymer block, "p" was an integer of 3 or more, and X was a residue of a polyfunctional coupling agent). Using the above block copolymer composition, a hot-melt adhesive composition was prepared in the same manner as in Example 1 and evaluated in the same manner as in Example 1. The results are shown in Table 2.

Comparative Example 3

1. Preparation of Block Copolymer Composition

Using a 2 liter pressure-resistant reactor, 400 g of a mixed solvent having a ratio of n-butane/cyclohexane=30/70, 0.07 mmol of tetramethylethylenediamine, and 0.63 mmol of n-butyl lithium as an initiator were present, and 3 g of styrene was added to polymerize for 1 hour at 30° C. Subsequently, 90 g of isoprene was added to polymerize for about one and half hours with temperature control by reflux cooling so that the reaction temperature was between 50° C. and 60° C. The coupling reaction was then carried out for 2 hours with the addition of divinyl benzene (DVB) as a coupling agent in an amount of 4-fold equivalent to total n-butyl lithium. After this, 1 ml of methanol as a polymerization terminator and 0.05 g of 2,6-di-butyl-p-cresol as an antioxidant were added to the reaction mixture to mix well, and then the obtained mixed solution was added dropwise into hot water heated to 85 to 95° C. in small portions to volatilize the solvent. The obtained polymer was ground and hot air dried at 85° C. to obtain a block copolymer composition. The obtained block copolymer composition was one comprising a block copolymer D represented by the formula: $(Ar-D)_pX(Ar'-D)_q$ (in the formula, Ar, Ar' were each an aromatic monovinyl polymer block, D was a conjugated diene polymer block, "p"+"q" was an integer of 3 or more, and X was a residue of a polyfunctional coupling agent, wherein the weight average molecular weight of Ar is 10500 and the weight average molecular weight of Ar' is 5500). The physical properties of the obtained block copolymer composition are shown in Table 2.

2. Preparation of Hot-Melt Adhesive Composition

Using the above block copolymer composition, a hot-melt adhesive composition was prepared in the same manner as in Example 1. Further, the hot-melt adhesive composition obtained above was added to toluene to prepare a solvent type adhesive composition having a solid concentration of 40%. In place of the hot-melt adhesive composition used in Example 1, the solvent type adhesive composition described above was evaluated in the same manner as in Example 1. The results are shown in Table 2.

TABLE 1

|  | Example 1 | Example 2 | Example 3 | Example 4 | Example 5 | Example 6 | Example 7 |
|---|---|---|---|---|---|---|---|
| Structure of three or more branches | Present | Present | Present | Present | Present | Present | Present |
| First stage of polymerization | | | | | | | |
| n-butyl lithium (mmol) | 1.75 | 1.67 | 1.5 | 1.25 | 1.0 | 1.0 | 1.25 |
| Monomer | Styrene | Styrene | Styrene | Styrene | Styrene | Styrene | Styrene |
| Addition amount (g) | 22 | 22 | 16 | 16 | 16 | 10 | 16 |
| Monomer | — | — | — | — | — | — | Isoprene |
| Addition amount (g) | — | — | — | — | — | — | 28 |
| Second stage of polymerization | | | | | | | |
| n-butyl lithium (mmol) | 0.75 | 1.67 | 0.5 | 1.25 | 2.33 | 2.33 | 1.25 |
| Monomer | Isoprene | Isoprene | Isoprene | Isoprene | Isoprene | Isoprene | Isoprene |
| Addition amount (g) | 78 | 78 | 84 | 84 | 84 | 90 | 56 |
| Coupling agent | | | | | | | |
| Type | DVB | DVB | DVB | DVB | DVB | DVB | DVB |
| Addition amount (coupling agent (mol)/total n-butyl lithium (mol)) | 4 | 4 | 4 | 4 | 4 | 4 | 4 |
| Physical properties of block copolymer | | | | | | | |
| Block copolymer A | | | | | | | |
| Molecular weight distribution (Mw/Mn) | 1.10 | 1.10 | 1.10 | 1.11 | 1.11 | 1.11 | 1.10 |
| Content in composition (%) | 95 | 95 | 94 | 95 | 95 | 95 | 94 |
| $(Ar^1 - D^1)/D^2$ (mass/mass) | 1.0/0.25 | 1.0/0.67 | 1.0/0.27 | 1.0/0.74 | 1.0/1.47 | 1.0/1.70 | 1.0/0.40 |
| $D^1/D^2$ (Mw/Mw) | 1.0/1.0 | 1.0/1.0 | 1.0/1.0 | 1.0/1.0 | 1.0/1.0 | 1.0/1.0 | 1.0/0.5 |
| Diblock copolymer B | | | | | | | |
| Molecular weight distribution (Mw/Mn) | 1.01 | 1.01 | 1.01 | 1.02 | 1.01 | 1.01 | 1.02 |
| Content in composition (%) | 4 | 3 | 4 | 3 | 2 | 2 | 3 |
| Polymer C | | | | | | | |
| Molecular weight distribution (Mw/Mn) | 1.01 | 1.01 | 1.01 | 1.02 | 1.02 | 1.02 | 1.02 |
| Content in composition (%) | 1 | 2 | 2 | 2 | 3 | 3 | 3 |
| Block copolymer composition | | | | | | | |
| Entire styrene content (%) | 22 | 22 | 16 | 16 | 16 | 10 | 16 |
| Weight average molecular weight (Mw)((×10^3) g/mol) | 433 | 336 | 567 | 460 | 330 | 336 | 441 |
| Vinyl bond content (%) | 7 | 7 | 7 | 7 | 7 | 7 | 7 |
| Melt index (g/10 min) | 10 | 5 | 12 | 7 | 2 | 20 | 14 |
| Properties of hot-melt adhesive composition (composition before cross-linking) | | | | | | | |
| Evaluation of producing adhesive in hot-melt | Good | Good | Good | Good | Good | Good | Good |
| Remaining glue test | Poor | Poor | Poor | Poor | Poor | Poor | Poor |
| SAFT (° C.) | 97 | 94 | 96 | 94 | 91 | 93 | 96 |
| Loop tack (N/25 mm) | 14 | 16 | 19 | 20 | 20 | 17 | 18 |
| Cross-linkability | Good | Good | Good | Good | Good | Good | Good |
| Properties of adhesive composition (composition after cross-linking) | | | | | | | |
| Remaining glue test | Good | Good | Good | Good | Good | Good | Good |
| SAFT (° C.) | 147 | 148 | 146 | 148 | 147 | 141 | 148 |
| Loop tack (N/25 mm) | 11 | 12 | 14 | 15 | 15 | 13 | 13 |

TABLE 2

| | Comparative Example 1 | Comparative Example 2 | Comparative Example 3 |
|---|---|---|---|
| Structure of three or more branches | Present | Present | Present |
| *First stage of polymerization* | | | |
| n-butyl lithium (mmol) | 2.22 | 1.82 | 0.63 |
| Monomer | Styrene | Styrene | Styrene |
| Addition amount (g) | 22 | 22 | 3 |
| Monomer | Isoprene | Isoprene | — |
| Addition amount (g) | 78 | 78 | — |
| *Second stage of polymerization* | | | |
| n-butyl lithium (mmol) | — | — | 0.63 |
| Monomer | — | — | Styrene |
| Addition amount (g) | — | — | 7 |
| Monomer | — | — | Isoprene |
| Addition amount (g) | — | — | 90 |
| *Coupling agent* | | | |
| Type | DVB | Tetramethoxy silane | DVB |
| Addition amount (coupling agent (mol)/total n-butyl lithium (mol)) | 4 | 0.25 | 4 |
| *Physical properties of block copolymer* | | | |
| *Block copolymer A* | | | |
| Molecular weight distribution (Mw/Mn) | — | — | — |
| Content in composition (%) | — | — | — |
| *Diblock copolymer B* | | | |
| Molecular weight distribution (Mw/Mn) | 1.01 | 1.01 | 1.18 |
| Content in composition (%) | 5 | 17 | 8 |
| *Polymer C* | | | |
| Molecular weight distribution (Mw/Mn) | — | — | — |
| Content in composition (%) | — | — | — |
| *Block copolymer D* | | | |
| Molecular weight distribution (Mw/Mn) | 1.1 | 1.02 | 1.16 |
| Content in composition (%) | 95 | 83 | 92 |
| *Block copolymer composition* | | | |
| Entire styrene content (%) | 22 | 22 | 10 |
| Weight average molecular weight (Mw)((×10^3) g/mol) | 504 | 242 | 450 |
| Vinyl bond content (%) | 7 | 7 | 7 |
| Melt index (g/10 min) | 7 | 9 | 0.1> |
| *Properties of hot-melt adhesive composition (composition before cross-linking)* | | | |
| Evaluation of producing adhesive in hot-melt | Good | Good | — |
| Remaining glue test | Poor | Poor | Poor |
| SAFT (° C.) | 96 | 92 | (105) |
| Loop tack (N/25 mm) | 14 | 14 | (17) |
| Cross-linkability | Good | Poor | — |
| *Properties of adhesive composition (composition after cross-linking)* | | | |
| Remaining glue test | Good | Poor | Good |
| SAFT (° C.) | 146 | 113 | (146) |
| Loop tack (N/25 mm) | 7 | 12 | (9) |

As shown in Table 1, the hot-melt adhesive compositions containing the block copolymer A of the present invention (Examples 1 to 7) had good evaluation for producing an adhesive in a hot-melt which evaluated hot-melt properties (moderate fluidity at the time of heating). In addition, the hot-melt adhesive composition before cross-linking also exhibited a large loop tack which indicated the initial tackiness.

In addition, it was found that the hot-melt adhesive composition containing the block copolymer A of the present invention (Examples 1 to 7) was also excellent in cross-linkability. Further, in the adhesive composition obtained by cross-linking the hot-melt adhesive composition, the glue remaining evaluation for evaluating the heat resistance stability was excellent, and the shear adhesion failure temperature (SAFT) exhibiting the high-temperature adhesiveness was high, and the loop tack exhibiting the initial tackiness was also large. Further, it has been found from comparative between the hot-melt adhesive composition before cross-linking and the adhesive composition after cross-linking that the shear adhesion failure temperature (SAFT) was improved without impairing a relatively large loop tack even when the hot-melt adhesive composition was cross-linked to form an adhesive composition.

On the other hand, in the adhesive composition after cross-linking containing the block copolymer of Comparative Example 1, the loop tack was small and the initial tackiness was not sufficient. The loop tack was also greatly reduced even when compared to the hot-melt adhesive composition before cross-linking.

The hot-melt adhesive composition containing the block copolymer of Comparative Example 2 was not sufficient in cross-linkability. In addition, in the adhesive composition after cross-linking, the adhesive composition was not sufficiently heat resistance stability due to a large amount of glue residue, and the shear adhesion failure temperature (SAFT) was also low and the adhesive properties at a high temperature was not sufficient.

In the block copolymer composition of Comparative Example 3, melting by heating was difficult, and evaluation as a hot-melt adhesive was difficult. Therefore, in Comparative Example 3, evaluation as a hot-melt adhesive was abandoned, and evaluation was performed by preparing a solvent type adhesive composition. In the solvent type adhesive composition after cross-linking, the loop tack was small and the initial tackiness was not sufficient.

The invention claimed is:

1. A hot-melt adhesive composition comprising,
   100 parts by mass of a block copolymer A,
   25 to 400 parts by mass of a tackifying resin,
   0.01 to 50 parts by mass of a free radical photo initiator, and
   0 to 200 parts by mass of a plasticizer,
   wherein the hot-melt adhesive composition further comprises a polyfunctional unsaturated compound, and
   the block copolymer A is represented by a following general formula (I), in which a ratio (($Ar^1$-$D^1$)/$D^2$) of a mass of a branched chain represented by $Ar^1$-$D^1$ to a mass of a branched chain represented by $D^2$ is 1.0/0.15 to 1.0/1.75, $$(Ar^1\text{-}D^1)_m X(D^2)_n \quad (I)$$

where, in the formula (I), $Ar^1$-$D^1$ and $D^2$ are each a branched chain bonded to X, $Ar^1$ is an aromatic monovinyl polymer block, $D^1$ and $D^2$ are each a conjugated diene polymer block, "m" is an integer of 1 or more, "n" is an integer of 1 or more, "m"+"n" is an integer of 3 or more, and X is a residue of a polyfunctional coupling agent.

2. A hot-melt adhesive composition obtained by cross-linking the block copolymer A contained in the hot-melt adhesive composition according to claim 1.

3. A hot-melt adhesive composition comprising,
   100 parts by mass of the block copolymer composition,
   25 to 400 parts by mass of a tackifying resin, 0.01 to 50 parts by mass of a free radical photo initiator, and 0 to 200 parts by mass of a plasticizer, wherein the hot-melt adhesive composition further comprises a polyfunctional unsaturated compound, and the block copolymer composition comprises a block copolymer A, a diblock copolymer B, and a polymer C, wherein a content of the block copolymer A in the block copolymer composition is 10% by mass or more, and a total content of the diblock copolymer B and the polymer C in the block copolymer composition is 60% by mass or less, a content of an aromatic monovinyl monomer unit in the block copolymer composition is within a range of 5 to 40% by mass, a weight average molecular weight (Mw) of the entire block copolymer composition is within a range of 300000 to 800000, a melt index measured according to ASTM D1238 of the block copolymer composition (G condition, 200° C., 5 kg load) within a range of 0.5 to 50 g/10 min, the block copolymer A is represented by a following general formula (I), in which a ratio (($Ar^1$-$D^1$)/$D^2$) of a mass of a branched chain represented by $Ar^1$-$D^1$ to a mass of a branched chain represented by $D^2$ is 1.0/0.15 to 1.0/1.75, $$(Ar^1\text{-}D^1)_m X(D^2)_n \qquad (I)$$

where, in the formula (I), $Ar^1$-$D^1$ and $D^2$ are each a branched chain bonded to X, $Ar^1$ is an aromatic monovinyl polymer block, $D^1$ and $D^2$ are each a conjugated diene polymer block, "m" is an integer of 1 or more, "n" is an integer of 1 or more, "m"+"n" is an integer of 3 or more, and X is a residue of a polyfunctional coupling agent, the diblock copolymer B is a diblock copolymer represented by a following general formula (II) and having a molecular weight distribution (Mw/Mn) of 1.20 or less, $$Ar^3\text{-}D^3 \qquad (II)$$

where, in the formula (II), $Ar^3$ is an aromatic monovinyl polymer block, and $D^3$ is a conjugated diene polymer block, and the polymer C is a conjugated diene polymer having a molecular weight distribution (Mw/Mn) of 1.20 or less.

4. A hot-melt adhesive composition obtained by cross-linking the block copolymer composition contained in the hot-melt adhesive composition according to claim 3.

5. The hot-melt adhesive composition according to claim 1, wherein a ratio ($D^1$/$D^2$) of a weight average molecular weight of the block $D^1$ in the branched chain represented by $Ar^1$-$D^1$ to a weight average molecular weight of the branched chain represented by $D^2$ in the general formula (I) is 1.0/0.3 to 1.0/1.1.

6. The hot-melt adhesive composition according to claim 1, wherein the polyfunctional coupling agent is a compound having two or more radically polymerizable groups in its molecule.

7. The hot-melt adhesive composition according to claim 1, wherein the polyfunctional coupling agent is divinyl benzene.

8. The hot-melt adhesive composition according to claim 1, wherein a molecular weight distribution (Mw/Mn) is 1.40 or less.

9. The hot-melt adhesive composition according to claim 1, wherein the polyfunctional unsaturated compound is at least one compound selected from a group consisting of trimethylolpropane triacrylate, trimethylol propane trimethacrylate, divinyl benzene, ethylene dimethacrylate, polyethylene glycol dimethacrylate, triallyl isocyanurate, triallyl cyanurate, diallyl phthalate, diallyl itaconate, and triallyl trimellitate.

10. The hot-melt adhesive composition according to claim 3, wherein a ratio ($D^1$/$D^2$) of a weight average molecular weight of the block $D^1$ in the branched chain represented by $Ar^1$-$D^1$ to a weight average molecular weight of the branched chain represented by $D^2$ is 1.0/0.3 to 1.0/1.1.

11. The hot-melt adhesive composition according to claim 3, wherein the polyfunctional coupling agent is a compound having two or more radically polymerizable groups in its molecule.

12. The hot-melt adhesive composition according to claim 3, wherein the polyfunctional coupling agent is divinyl benzene.

13. The hot-melt adhesive composition according to claim 3, wherein a molecular weight distribution (Mw/Mn) is 1.40 or less.

14. The hot-melt adhesive composition according to claim 3, wherein a vinyl bond content in a conjugated diene monomer unit in the block copolymer composition is 1 to 20% by mass.

15. The hot-melt adhesive composition according to claim 3, wherein the polyfunctional unsaturated compound is at least one compound selected from a group consisting of trimethylolpropane triacrylate, trimethylol propane trimethacrylate, divinyl benzene, ethylene dimethacrylate, polyethylene glycol dimethacrylate, triallyl isocyanurate, triallyl cyanurate, diallyl phthalate, diallyl itaconate, and triallyl trimellitate.

16. The hot-melt adhesive composition according to claim 3, wherein the total content of the diblock copolymer B and the polymer C in the block copolymer composition is 0.5 to 60% by mass.

* * * * *